March 9, 1948.  W. WHALEY  2,437,629
LOADING MACHINE
Filed Oct. 24, 1944   7 Sheets-Sheet 1
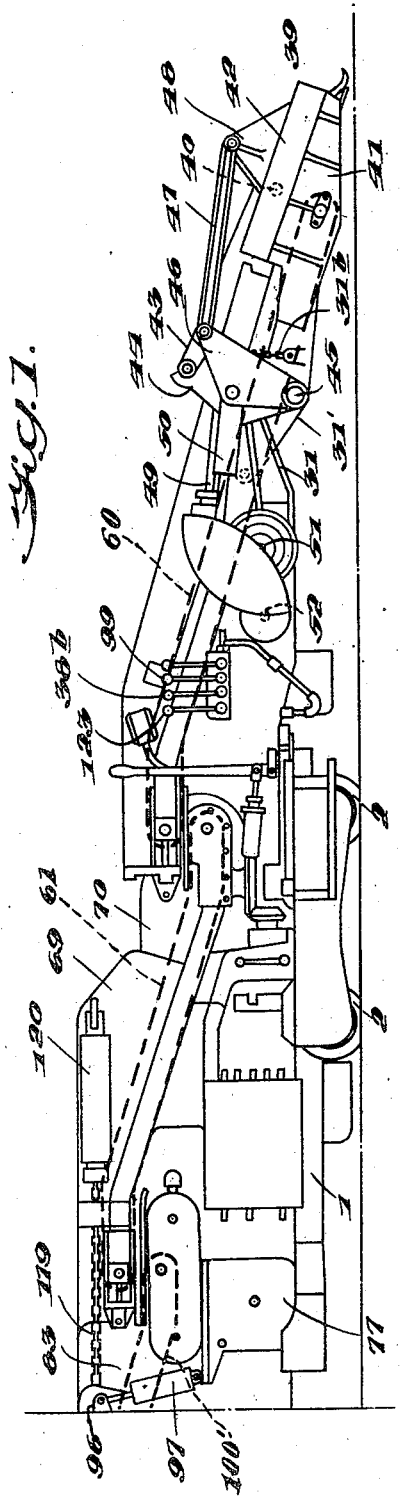
Inventor
William Whaley
By Cyrus Kahn & Suecker
his Attorneys

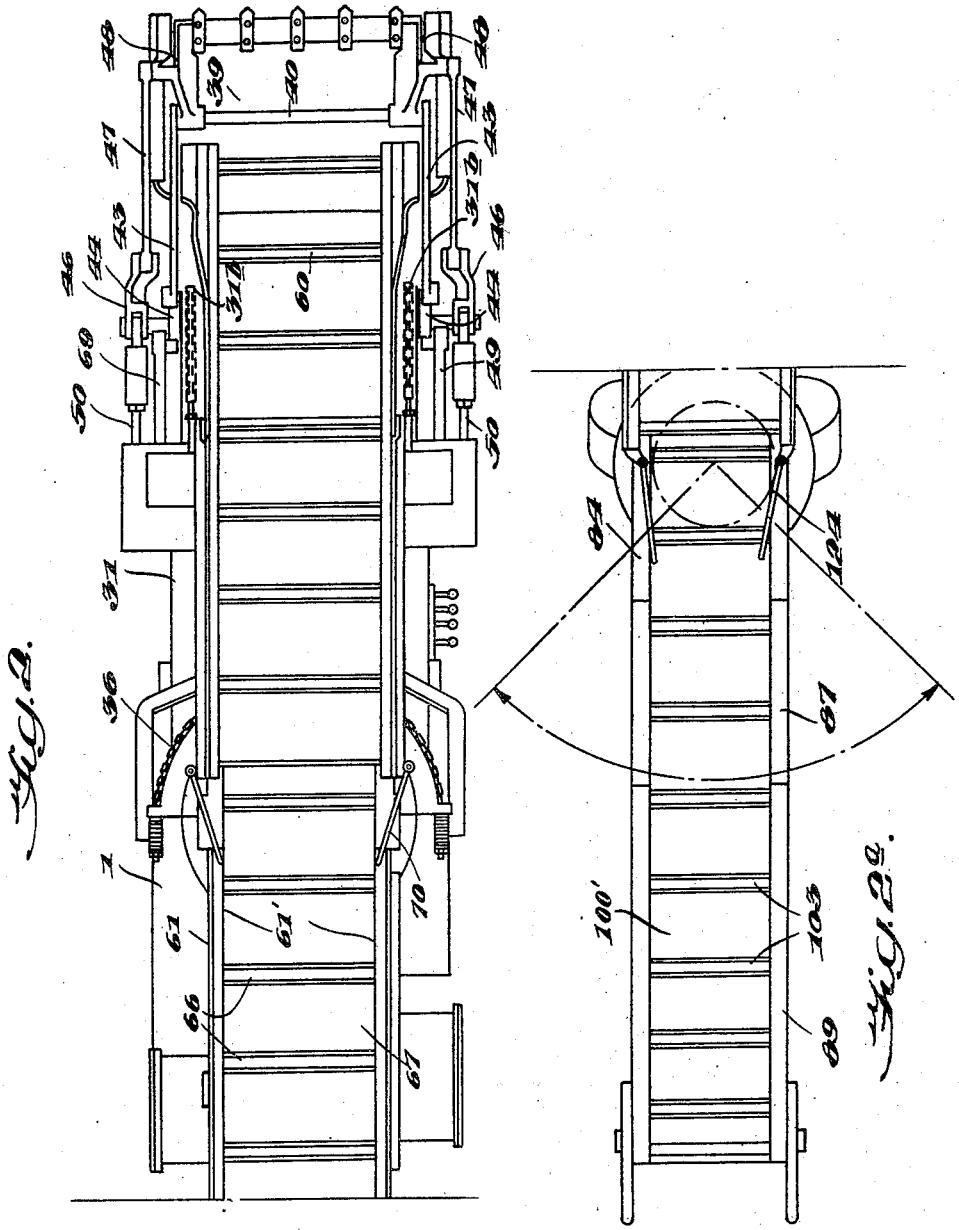

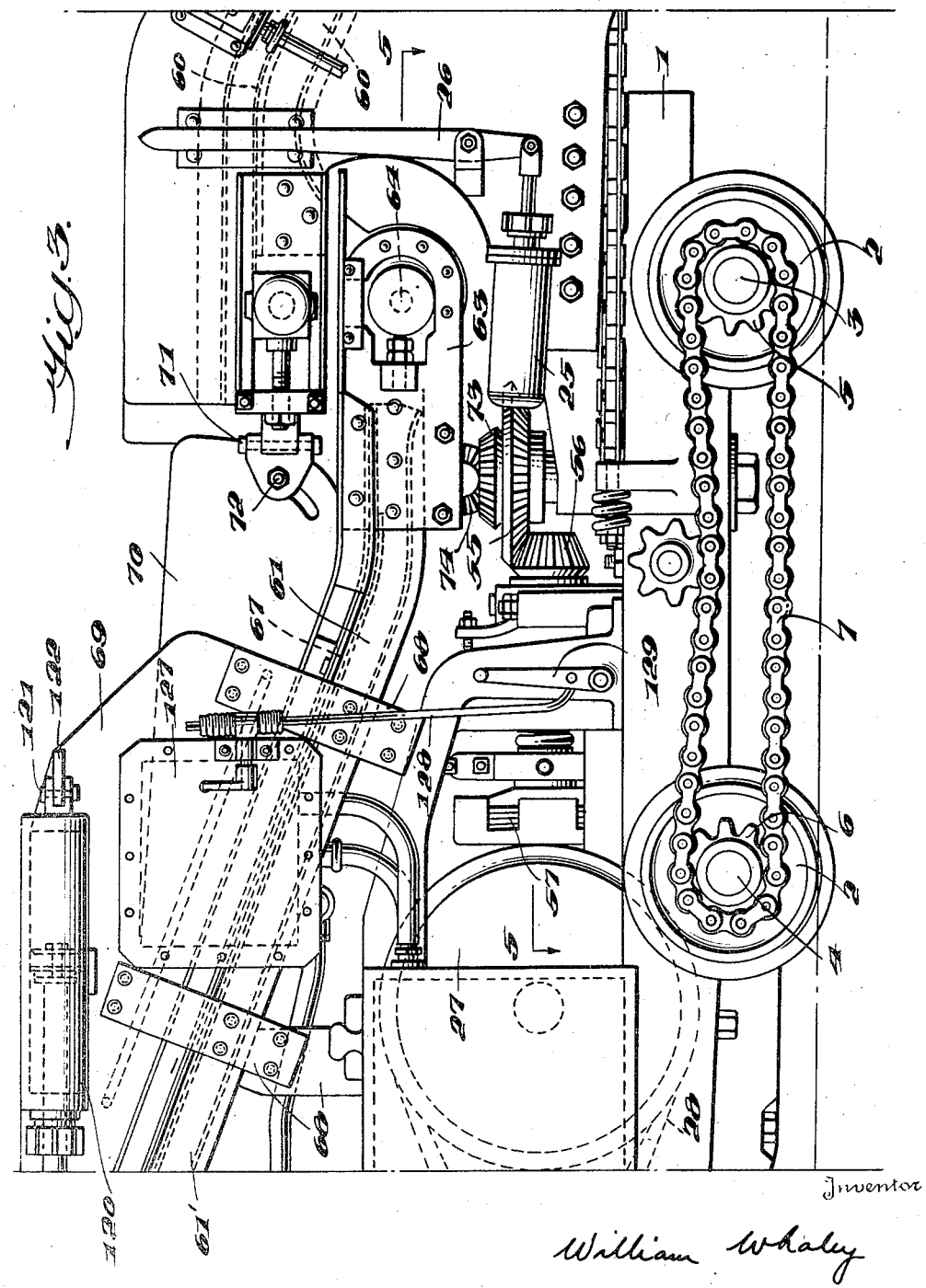

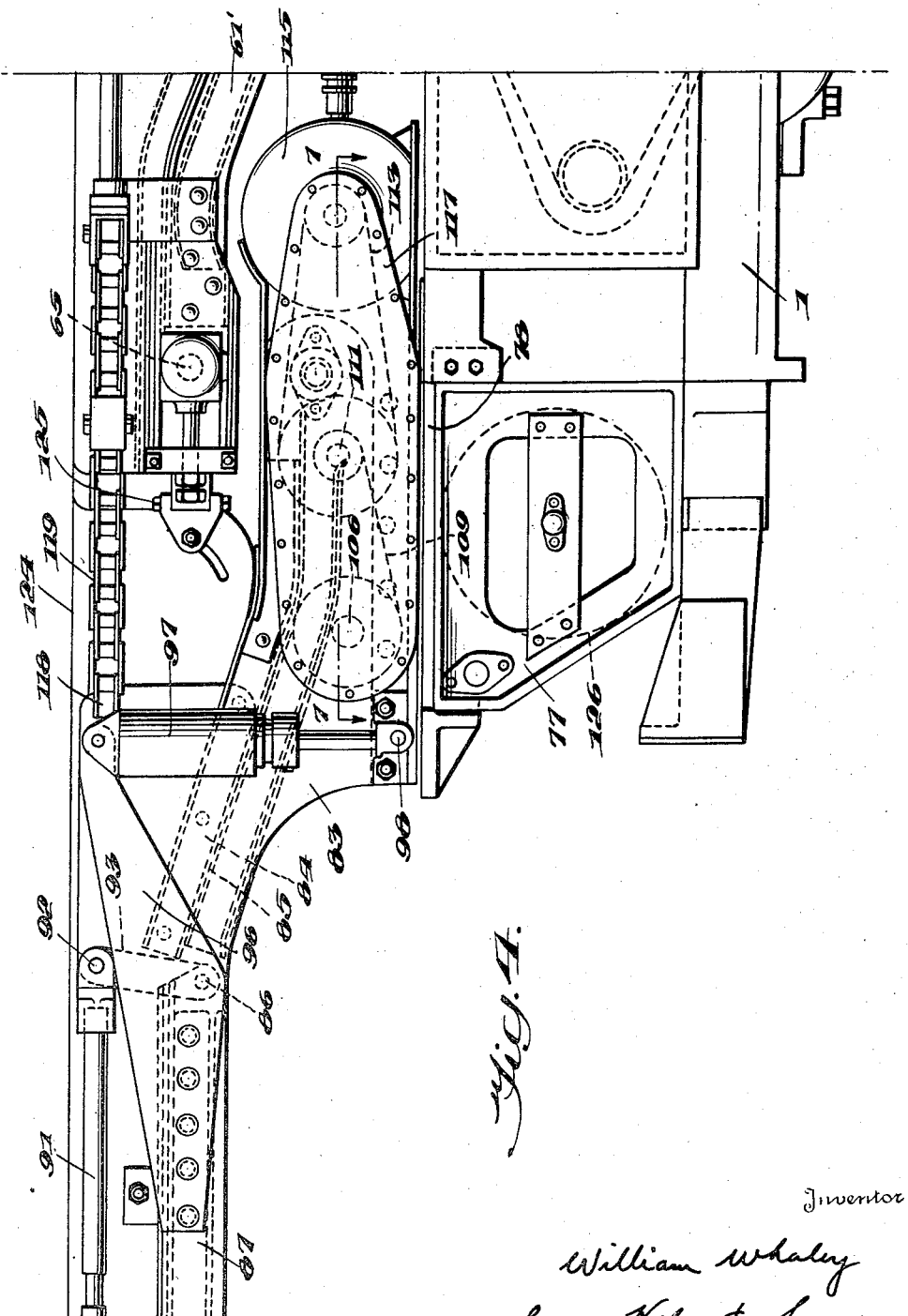

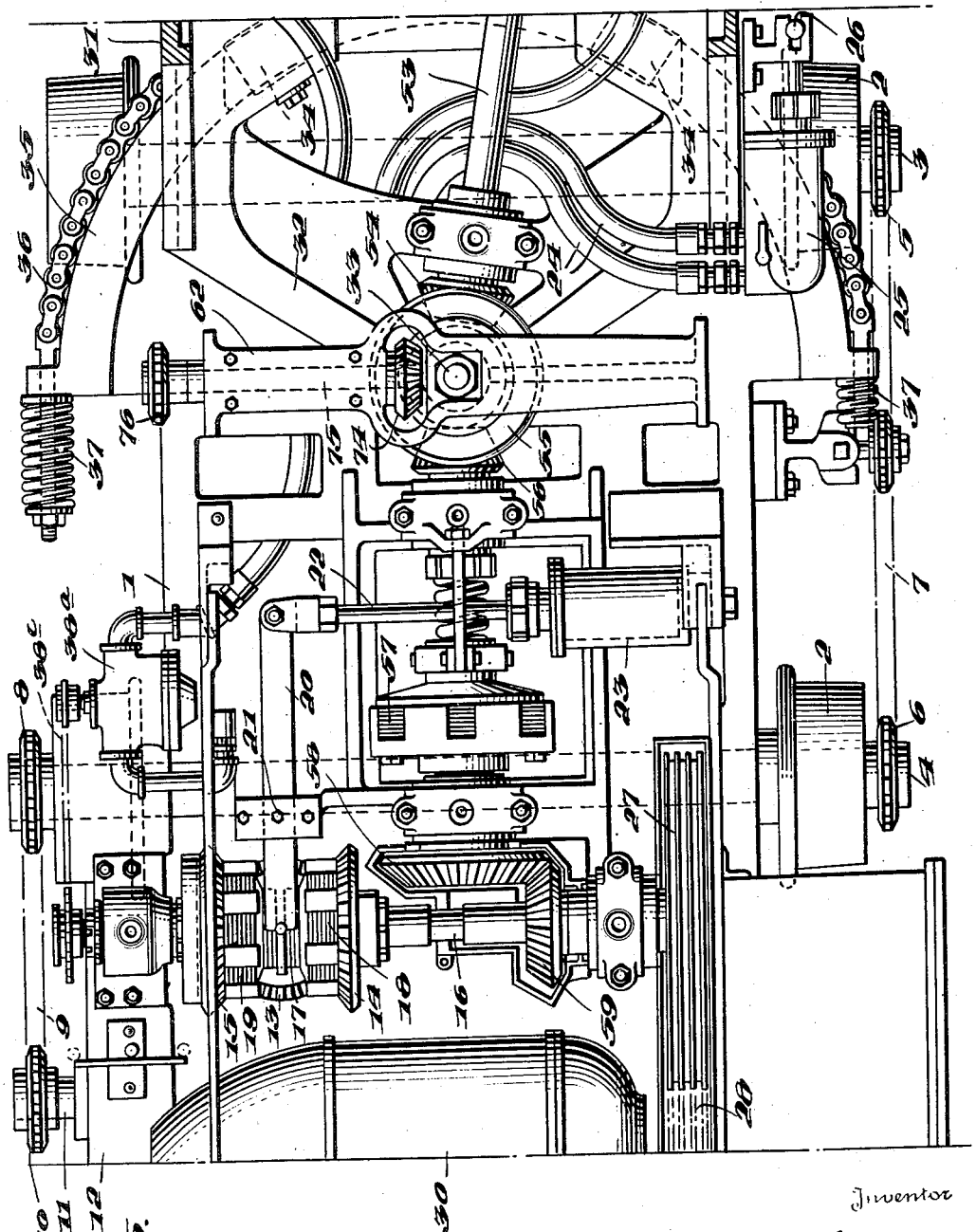

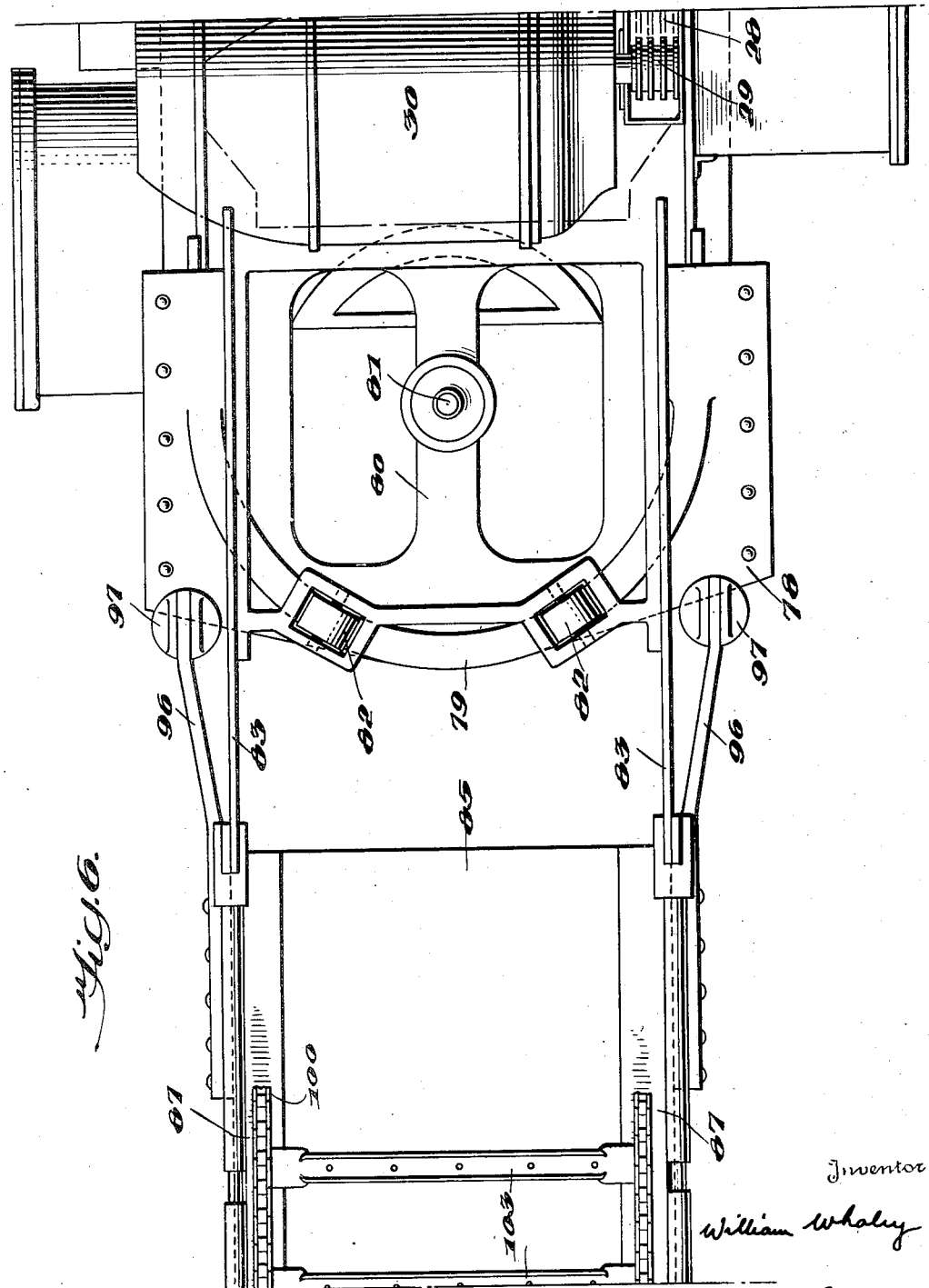

March 9, 1948. W. WHALEY 2,437,629
LOADING MACHINE
Filed Oct. 24, 1944 7 Sheets-Sheet 7
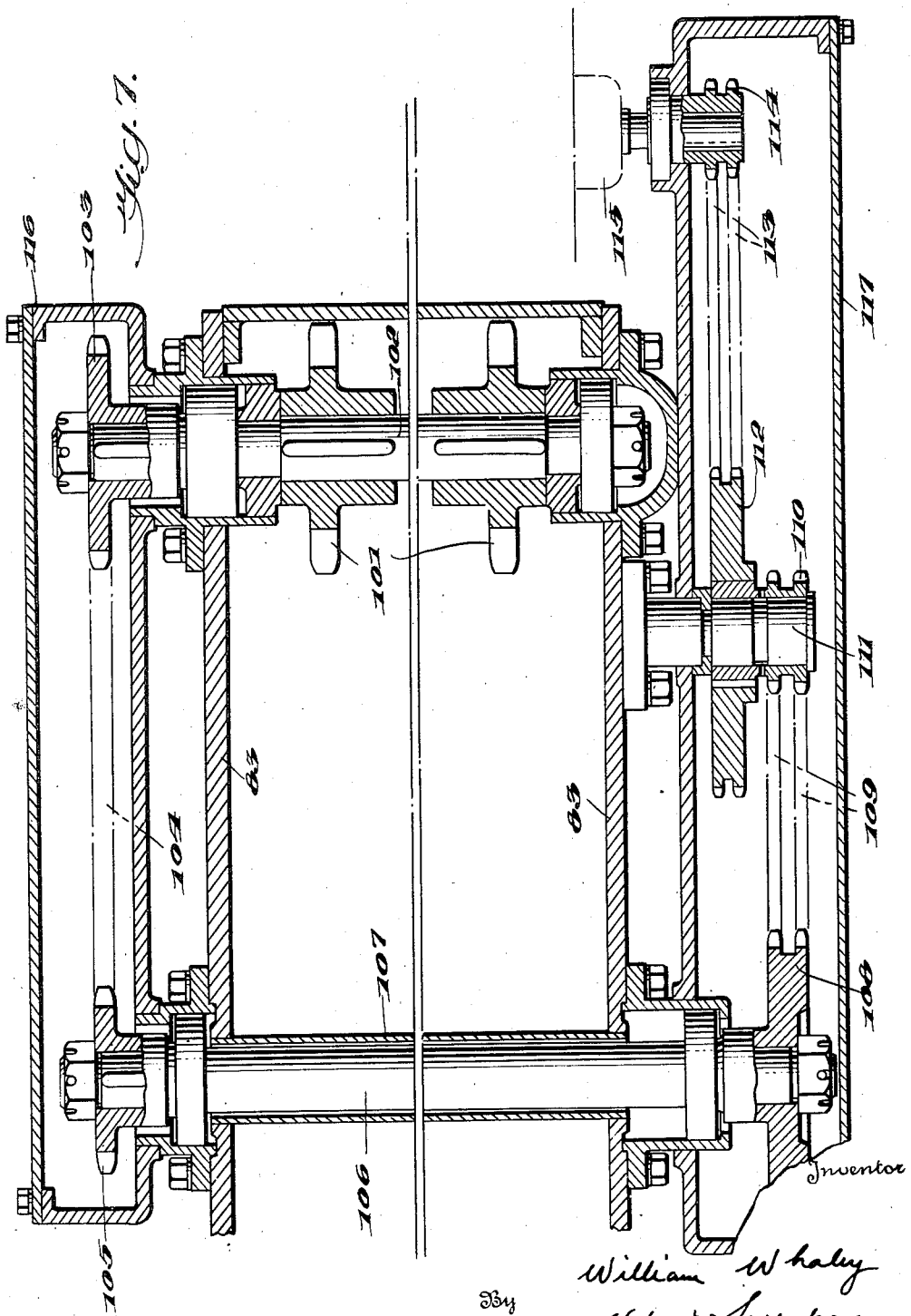

Patented Mar. 9, 1948

2,437,629

UNITED STATES PATENT OFFICE 2,437,629

LOADING MACHINE

William Whaley, Knoxville, Tenn.

Application October 24, 1944, Serial No. 560,126

13 Claims. (Cl. 198—7)

This invention relates to improvements in loading machines of the character used primarily for shoveling coal, loose rock and similar material, and discharging such lading into cars or other vehicles for transportation to a remote point or place of use.

This invention is an improvement on my prior loading machines as set forth particularly in patent, No. 1,814,067, July 14, 1931, and patent, No. 1,839,625, January 5, 1932.

In my prior loading machines, provision was made for shoveling the material at the gathering point and directing it into a jib conveyor which in turn discharges said material into a rear conveyor for direction into the cars. While the jib section and rear conveyor of the machine were mounted for relative transverse swinging motion, this lateral swing was limited.

The object of this invention is to improve the construction of the loading machine with particular reference to the extent of relative lateral swing of both the jib and the rear conveyor with respect to each other, which will make it practical to use the loading machine in mine locations which have not been possible heretofore. It is desirable to provide for a lateral swing of the rear conveyor for as much as 45° from the center axis of the machine on each side, so as to discharge in the center line of a car standing on a 90° curve of small radius sixteen feet or more and back of the loading machine. This is made possible according to the present invention.

This object is accomplished by the provision of three conveyor sections on the loading machine. One section is fixed on the main frame of the machine and discharges into a rear conveyor section that is pivotally mounted for swinging movement transversely relative to said fixed section, the point of discharge from the fixed section into the rear section being above the rear end portion of the main frame of the machine. The rear section is supported on a pivot at the rear end of the main frame for swinging movement through an arc of 45° to each side of the center line of the machine frame, which is sufficient to discharge over the desired area of swing at either side of the center line of the machine.

Provision is made for driving the rear conveyor section independently of the fixed section directly from an independent motor to maintain proper operation thereof in different adjusted positions. The swinging, as well as the raising and lowering of the rear conveyor section, is accomplished hydraulically so as to shift said rear conveyor section readily to proper position for discharge into mine cars. Said rear conveyor section is also capable of being raised and lowered to different horizontal positions for transport through a mine of low head-room and yet adjustable into proper position over the car in a minimum of space thereabove.

A preferred embodiment of this invention is shown in the accompanying drawings in which:

Fig. 1 is a side elevation of the forward end portion of the loading machine;

Fig. 1a is a similar view of the rear end portion thereof;

Fig. 2 is a top plan view of the forward end portion thereof;

Fig. 2a is a similar view of the rearward end portion thereof;

Fig. 3 is a side elevation enlarged relative to Fig. 1, showing the middle section of the machine;

Fig. 4 is a similar view of the rear end portion of the machine truck, showing the mounting thereon of the forward end of the movable rear conveyor section;

Fig. 5 is a horizontal sectional view substantially on the line 5—5 of Fig. 3, showing in plan the main driving parts of the machine;

Fig. 6 is a detail plan view of the mounting of the forward end portion of the swinging rear conveyor section on the truck, with parts omitted for clearness of illustration;

Fig. 7 is a horizontal sectional view substantially on the line 7—7 of Fig. 4, showing the drive of the rear conveyor section;

Figs. 8, 9 and 10 are diagrammatic plan views of the machine in different angularly adjusted positions;

Fig. 11 is a top plan view of the mid-portion of the machine;

Fig. 12a is a similar view of the section between the main body conveyor and the jib; and Fig. 12b is a similar view of the section between the main body conveyor and the discharge conveyor.

This loading machine is composed generally of a main frame or body mounted on wheels adapted generally to be supported by track rails when the machine is customarily adapted for transportation on the usual trackway in the mine or other point of loading. The driving mechanism is supported on the body or main frame for propelling the machine, as well as for operating the propelling structure and the forward conveyor section. The jib which supports the shovel on the forward end thereof, projects forwardly from the main frame or body, and supports also the forward conveyor which transports the lading from the shovel back onto an intermediate conveyor section, which in turn transports the lading onto a rear conveyor section. The latter is mounted on the rear end of the frame or body for horizontal swinging movement relative thereto, and at least a part thereof is adapted to be raised and lowered to different positions while maintained in parallel relation with the trackway.

The invention is described in connection with a machine for loading coal or the like in a mine, but it will be understood that it may be used for loading ore or other materials, as may be found desirable. Generally coal mines are provided with trackways on which such loading machines are mounted for transportation through the mines, and this invention will be so described, although it should not be so restricted, being capable of mounting on any desired supporting means, and for loading various materials.

The main frame or body of the loading machine is designated generally by the numeral 1 and is supported by four track wheels 2 which are mounted on forward and rearward axles 3 and 4. The wheels 2 are shown to be of the character known as flanged wheels adapted to be mounted on the usual track rails. The axles 3 and 4 are provided respectively with sprocket wheels 5 and 6 which are connected together by a sprocket chain 7.

As shown in Fig. 5, the wheels 2 are adapted to be operated by a power drive to the axle 4, at the opposite end thereof from the sprocket 6, on which a sprocket 8 is mounted. The sprocket 8 is driven through a sprocket chain 9 from a sprocket 10 mounted on a shaft 11, which shaft 11 is connected through worm gearing in a gear box 12 with a shaft on which a gear 13 is mounted. The gear box 12 preferably includes also a change speed transmission for operating the shaft 11 at different speeds. The gear 13 is in constant mesh with gears 14 and 15 journaled loosely on a cross shaft 16. Mounted on the shaft 16 between the gears 14 and 15, and slidably keyed to said shaft, is a hub 17. The hub 17 is connected respectively with the gears 14 and 15 through clutches 18 and 19, shown to be of the face disc type. Upon the engagement of either clutch 18 or 19, a driving connection is established from the shaft 16 through the hub 17 and the clutch 18 or 19 to the corresponding gear 14 or 15. Depending upon which of the gears 14 or 15 is operated thereby, the gear 13 will be driven, and through the worm gearing connected therewith in the gear box 12, this gear 13 will drive the sprocket 10, and thereby operate the sprocket 8 mounted on the axle 4. This will rotate the axles 3 and 4 to drive the propelling wheels 2 in one direction or the other (Fig. 5).

The hub 17 is adapted to be shifted in one direction or the other by a surrounding ring pinned thereto and connected with a shifter yoke 20. The yoke 20 is pivotally mounted at 21 on the main frame structure 1, intermediate the ends of said yoke. The end thereof opposite from the point of connection with the hub 17, is pivotally connected with a piston rod 22, having a piston on the opposite end thereof mounted in a cylinder forming a hydraulic power device designated generally at 23. The opposite ends of the cylinder of the power device 23 are connected through hydraulic tubes 24 in a closed circuit with opposite ends of a hydraulic power device 25, as set forth more in detail in my prior patent, No. 1,814,067. The power device 25 is operated by means of a hand lever 26 (Figs. 3 and 5) mounted within convenient reach of the operator.

The main drive shaft 16 (Fig. 5) carries a pulley 27 on the right hand end thereof (as viewed toward the front of the machine) which pulley 27 is connected through belting 28 with a pulley 29 (Fig. 6) mounted on the armature shaft of the main drive electric motor 30. Thus, so long as the motor 30 is operating by the supply of electric current thereto, the main drive shaft 16 is likewise operating, capable of actuating the parts of the machine that are adapted to be connected therewith.

At the forward end of the main frame 1 is located the jib of the loading machine on which is mounted the shovel and forward conveyor. The jib includes a frame 31 having a forward section 31' pivotally supported thereon for up and down swinging movement relative to the frame 31, under control of a hydraulically actuated flexible device 31b. The frame 31 is supported by a bearing casting 32 at its rearward end, to which it is fixed, which bearing casting 32, in turn, is journaled on an upright king pin 33 mounted on the main frame 1. The bearing casting 32 also carries rollers 34 journaled in the casting and mounted to roll upon an arcuate trackway 35 rigidly secured to the main frame 1. Extending about the periphery of the trackway 35 is a sprocket chain 36, the opposite ends of which are anchored to the trackway through yieldable connections 37.

Fixed on the jib frame 31 is a hydraulically operated sprocket gear (not shown) engaging the sprocket chain 36 so that upon rotation of the gear in either direction, the jib frame 31 is caused to swing about the axis of the king pin 33 in one direction or the other, while riding upon the trackway 35. The hydraulic power device operating the sprocket wheel which moves the jib, is actuated by a hydraulic pump 38a (Fig. 5) controlled by a lever 38b (Fig. 1) located at a side of the machine within convenient reach of the operator. The pump 38a is power driven by a sprocket connection 38c from the projecting end of the drive shaft 16.

The jib construction generally is substantially that set forth in my prior patent, No. 1,814,067, to which reference is had for details, and only the general structure thereof will be described here.

At the forward end of the jib frame section 31 is mounted a shovel 39 (Figs. 1 and 2), pivotally supported on a cross shaft 40 mounted in the jib frame section 31'. The shovel 39 is constructed to scoop up the coal or other loose material and to swing upward and rearward to slide such material backward onto the conveyor of the jib. Accordingly, the shovel 39 operates within and above sole plate structure 41 fixed at the forward end of the jib frame section 31'.

The shaft 40 is mounted for bodily sliding movement with the shovel 39, in opposed guideways 42 at opposite edges of the sole plate structure 41, so as to move lengthwise of said guideways for bodily forward and rearward movement of the shovel, while also permitting swinging movement of the shovel about the axis of the shaft 40.

To accomplish the sliding movement of the shaft 40 in the guideways, said shaft is provided with arms 43 adjacent the opposite ends thereof which extend therefrom to rocker members 44, pivotally mounted at 45 on opposite sides of the jib frame 31'. Also mounted on the pivots 45 beside the rocker members 44 are rocker members 46 having connecting rods 47 pivoted thereto at one end and extending to shovel side plates 48 at the opposite end thereof to which said rods are pivoted. Thus upon backward and forward swinging motion of the rocker members 44, the shaft 40 will slide backward and forward in the guideways 42. Also, upon swinging motion of the rocker members 46, the connecting rods 47 will cause an upward swinging motion of the shovel 39. These movements are so coordinated that the shovel will be caused to slide forward into the material and then will swing upward as it moves rearward relative to the sole plate structure 41, for allowing the loose coal or other material to slide backward off the shovel from which it is directed into the jib for upward conveyance therefrom.

The rocker members 44 and 46 are operated by connecting rods 49 and 50, respectively, which extend to cranks offset with respect to each other but carried on a common crank shaft 51, journaled on the jib frame 31. The crank pins connected with the rods 49 and 50 are spaced with the axes thereof in a circular arc the center of which is coincident with the center of the crank shaft 51. The crank shaft 51 has geared connection, as shown more in detail in my patent, No. 1,814,067, with a jack shaft 52 which in turn is geared to a jib shaft 53, extending generally longitudinally of the jib frame 31, as shown in Fig. 5.

The rearward end of the jib shaft 53 is journaled in a bearing in the casting 32, and carries a bevel pinion 54 in mesh with a bevel gear 55 journaled about the king pin 33. The gear 55 is in mesh also with a pinion 56 mounted on a shaft extending lengthwise of the main frame 1. Said shaft is formed of separated sections adapted to be connected together through a face disc clutch 57, the parts of which are mounted on the respective sections of the shaft. One of said sections carries the pinion 56, and the other, a pinion 58 in mesh with a bevel pinion 59 keyed on the main drive shaft 16.

Therefore, when the clutch 57 is engaged during the operation of the motor 30 and the main drive shaft 16, turning movement will be imparted through the clutch 57, bevel gears 54—56, 58—59, and jib shaft 53, to the crank shaft 51, which operates the cranks thereon to cause reciprocating movement of the connecting rods 49 and 50. These connecting rods swing the rocker members 44 and 46 back and forth to impart the desired shoveling actions to the shovel 39, as described above.

The material thus gathered by the shovel 39 and directed backwardly therefrom into the jib, is discharged into a flight conveyor of the usual character, designated generally by the numeral 60. As described in my patent, No. 1,814,067, said flight conveyor may comprise a pair of endless chains on opposite sides of the jib, connected by flight bars that extend over a scraper plate upon which the coal or other lading is discharged by the shovel and conveyed upwardly through the jib. The endless chains extend over cross shafts at opposite ends thereof and the upper shaft is adapted to be driven by means of a chain from a sprocket on the jack shaft 52. It will be evident that the shaft 52 will be driven whenever the shovel is operated, to transmit movement to the jib conveyor.

Mounted upon the main frame 1, in fixed position relative thereto, is a middle conveyor section adapted to be secured rigidly with respect to said frame. Said middle section is formed also of a flight conveyor with its forward end under-lying the rear end of the jib conveyor, to receive the coal or other lading therefrom and to convey the same rearwardly to the rear end section hereinafter described.

As shown in Figs. 1 and 3, the middle conveyor section, designated generally at 61, includes opposed side guides 61' rigidly fixed upon a frame pedestal 62 which also carries a bearing structure 63 in which the head shaft 64 of said middle conveyor 61 is mounted. The middle conveyor section is free of the jib for swinging of the latter relative thereto. Extending over the head shaft 64 and over a tail shaft 65 (Fig. 4), at the opposite ends of the middle conveyor 61, are endless sprocket chains carrying flight bars 66 (Fig. 2). The endless sprocket chains are guided in their respective upper and lower runs by the guides 61', while the upper runs of said chains move the flight bars 66 over a plate 67 extending between the guide channels 61'.

The upper portion of the middle conveyor is supported upon the main frame 1 by means of brackets designated generally at 68. The brackets 68 are attached to the side guides 61'. These brackets 68 also serve to support side plates 69 secured at opposite sides of the flight conveyor above the channels 61'.

Disposed at opposite sides of the middle conveyor 61, at the forward end thereof and at the discharge end of the jib conveyor, each are hopper sides 70, pivotally mounted at 71 on a bracket 148 carried by the rearward end of the jib for parallel swinging movement relative thereto, so as to remain substantially parallel with the middle conveyor 61 while allowing relative transverse movement of the jib. The bracket supporting each hopper plate 70 on the pivot 71 also has a pin and slot connection 72 with said plate which permits the latter to swing vertically relative to the jib to accommodate for up and down movements of the latter relative to the middle conveyor 61.

The relation of the hopper plates 70 in different relative positions of swinging movement of the jib section, is shown in Fig. 11 and Fig. 12a. These hopper plates form a continuation of the side walls for the material passing from one conveyor to the next. The ends of the plates 70 opposite the hinge connection 71 carry eye-bolts 146 which surround and ride on guide rods 147 that are rigidly attached to the side plates 69. Therefore, as the conveyor 60 is moved to the right or to the left at the forward end of the conveyor 61, the hopper plates 70 swing in accordance therewith to the positions indicated in the drawings. These side plates 70 form a continuation of the trough through which the material is moved by the conveyors in passing from one section of the machine to another.

The bevel gear 55 (Figs. 3 and 5) also has fixed thereto a bevel pinion 73, meshing with a bevel pinion 74 mounted on a short shaft 75 that extends laterally relative to the main frame and carries a sprocket 76 on the outer end thereof, from which a sprocket chain extends to the head shaft 64 of the middle conveyor 61 for operating said conveyor whenever the jib operating parts are driven for shovel operation.

At the rear end of the middle conveyor is mounted a third or rear conveyor 100' which, nevertheless, is capable of transverse swinging movement with respect to the main frame and the middle conveyor that is secured thereon, to receive the coal or other lading from the middle conveyor and to direct such lading into a car or to other point of discharge. This rear conveyor also has a section capable of being raised or lowered to different parallel positions for the purpose described in my prior patent, No. 1,839,625.

As shown in Figs. 4 and 6, the main frame or body 1 has upstanding laterally spaced pedestals 77 supported thereon in transversely spaced relation, upon which are mounted a plate segment 78. This plate segment 78 has an arcuate trackway 79 formed thereon. Superposed on the segment 78 is a center-piece casting 80 pivoted to the segment 78 at 81 (Fig. 6) for pivotal movement about the center axis thereof. The center-piece casting 80 has rollers 82 journaled on pins in recesses formed therein in positions to ride upon the arcuate trackway 79 to support the rear conveyor for lateral swinging movement relative to the main frame.

Supported upon the center-piece casting 80 are side plates 83 which are upstanding therefrom and rigidly secured to said casting. Each of the side plates 83 carries on its inner face upper and lower guideways 84 facing toward the opposite side, with a scraper plate 85 therebetween.

At the rearward end of the side plates 83 are pivoted on a cross shaft 86, side guides 87 forming a continuation of the lower guideways 84. Also hinged to the rearward end of the guides 87, as at 88, is a rearward frame section 89, having similar guideways and with a tail shaft 90 journaled therein.

The pivotal connections 86 and 88, adapt the sections 87 and 89 for adjustment to different upper and lower positions relative to the side plates 83. To maintain the conveyor section 89 in different parallel positions for the different inclined or horizontal positions of swinging movement of the section 87, these parts are connected together by a tie rod 91 pivoted at its rearward end at 92 to a bracket 93 fixed to the forward end of each side plate 83, and at its rearward end each tie rod 91 is pivoted at 94 to a bracket 95 fixed to the rear conveyor section 89. Therefore, upon upward swinging movement of the conveyor section 87 from the position shown in Fig. 4, the section 89 is maintained in parallel horizontal positions, generally for the purposes described in my patent, No. 1,839,625.

Bracket arms 96 (Fig. 4) are fixed to opposite sides of the conveyor section 87 to cause vertical swinging movement of said section. The forward free ends of the bracket arms 96 are pivotally connected with hydraulic power devices 97, the lower ends of which extend downward to pivotal connections 98 on the side plates 83.

The supply of hydraulic pressure to the power devices 97 is controlled by a lever 99 (Fig. 1) within convenient reach of the operator. Upon the forcing of liquid under pressure into the lower end of the cylinder of each hydraulic power device 97, the piston will be forced upwardly relative to the cylinder thereof, or the latter drawn downward, thus applying downward pull on each of the arms 96, swinging the conveyor section 87 upward, thereby raising the rearmost conveyor section 89 to different horizontal positions, which operation will be reversed upon opening of the pressure holding valve whereby the pressure will be released allowing the conveyor to drop down by gravity.

Extending through the guideways formed in the different conveyor sections are endless sprocket chains 100 which extend over sprockets 101 (Fig. 7) keyed on a head shaft 102 at the forward end of the rear conveyor, and over similar sprocket on the tail shaft 90 at the rearward end thereof. These sprocket chains are moved through the guideways 84, and through similar guideways in the other conveyor sections 87 and 89, and are connected together through transverse flight bars 103 which move over the scraper plate 85 and over similar plates in the other conveyor sections, to convey the material thereover.

These conveyor chains are driven from the shaft 102 as shown in Fig. 7. This shaft 102 is journaled at its opposite ends in bearings in the side plates 83, and on one end thereof, externally of the adjacent plate 83, the shaft 102 carries a sprocket 103. A sprocket chain 104 extends from the sprocket 103 to a sprocket 105 keyed on a shaft 106 extending transversely through the spaced side plates 83 in which said shaft is journaled, and is shielded by a surrounding tube 107.

The opposite end of the shaft 106 carries an enlarged sprocket 108 connected by sprocket chains 109 with a reduced sprocket 110. The sprocket 110 is journaled on a stub shaft 111 fixed to the adjacent side plate 83, and is rigid with an enlarged sprocket 112. The latter is connected through sprocket chains 113 with a reduced sprocket 114 keyed on the armature shaft of a motor 115 (Figs. 4 and 7). Thus the motor drives through small-to-large sprockets, effecting a reduction of speed in the power transmitted to the shaft 102. These drives are enclosed within housings 116 and 117 fixed to the outer sides of the respective plates 83.

Each of the side plates 83 near its upper edge has secured thereto a lug 118 to which is attached an end of a chain 119 (Fig. 4), the opposite end of which chain 119 is secured to the piston rod of a hydraulic power device 120 (Fig. 3). The opposite end of the power device 120 is pivotally connected at 121 with a bracket 122 fixed on the corresponding side plate 69 of the middle conveyor. The hydraulic power devices 120 on the opposite sides of the machine are operated under control of a hand lever 123 (Fig. 1) within convenient reach of the operator. These power devices 120 may be so controlled as to apply a lateral pull through the corresponding chain 119 to either side plate 83 in a lateral direction, whereby to swing the rear conveyor bodily about its pivot pin 81 with respect to the plate segment 78.

Hopper plate sides are shown at 124 pivotally supported at 125 from the middle conveyor frame structure 61'. These hopper plates 124 overlie the forward section of the rear conveyor for directing the coal thereto from the middle conveyor, being free to swing laterally to accommodate the lateral adjusting movements of said rear conveyor. These hopper plates 124 are pivotally mounted and function substantially in the same manner as the corresponding hopper plates 70 described above, and as will be evident from Fig. 11 and Fig 12b.

The machine is provided with a reel 126 (Fig. 4) journaled between the pedestals 77, for holding the electric cable used to supply electric current for the operation of the machine, particularly the motors 39 and 115 thereof. Suitable controls are provided for the respective motors, including a control box for the rear conveyor motor, designated generally at 127 (Fig. 3) having a control switch therein operated by the control rod 128 from a hand lever 129, constructed to provide the desired control for the rear conveyor motor.

The operation of the machine will be evident from the foregoing description taken in connection with my prior patents, Nos. 1,814,067 and 1,839,625.

With the machine in operation, the shovel 39 is caused to dig into the coal or other lading and to swing upward therein, causing this material to fall backward onto the jib conveyor 60. The material is directed upward on this conveyor and discharged therefrom onto the fixed intermediate conveyor 61. The latter in turn directs the lading onto the rear conveyor which latter is pivoted for lateral swinging movement as indicated in Fig. 2, and also for raising and lowering movement, but with its discharge section maintained in horizontal positions as will be evident from Fig. 1. The latter section will direct the material into a car, transport vehicle, or to other point of discharge.

By the construction here provided, it is possible to swing the jib laterally of the center axis of the main body frame 1 through an arc as much as 50° on either side of the center thereof. At the same time or instead of swinging the jib, the discharge conveyor may be moved laterally relative to the main body of the machine through an arc of 45° on either side of the center, as indicated in Figs. 2, 9 and 10. This is greater lateral swing than has been possible heretofore in prior loading machines of this type, and makes it possible for the machine to discharge in the center line of a car standing on a ninety degree curve of sixteen feet or more radius and back of the loading machine. This provides greater facility for operation in the mine than has been obtained heretofore.

I claim:

1. In a loading machine, the combination of a body structure, a jib section supported at the forward end of the body structure for lateral swinging movement relative thereto, a loading device supported on the jib section for loading material, a power conveyor supported on the jib section for receiving the material from the loading device and for conveying said material rearwardly therefrom, a second power conveyor mounted in fixed position on the body structure to receive the material from the jib conveyor and to direct said material rearwardly of the body structure, a discharge conveyor mounted on the body structure for lateral swinging movement relative thereto in position to receive the material from the fixed conveyor and to discharge said material from the machine, said discharge conveyor including separate sections connected together in series with one section mounted on the body structure for swinging movement about a substantially vertical axis and supporting the other sections of said discharge conveyor thereon for lateral swinging movement, a second section connected with the first-mentioned section and pivoted thereto for upward swinging movement, and a discharge section supported by the second section.

2. In a loading machine, the combination of a body structure, a jib section supported at the forward end of the body structure for lateral swinging movement relative thereto, a shoveling device supported on the jib section for shoveling material, a power conveyor supported on the jib section for receiving the material from the shoveling device and for conveying said material rearwardly therefrom, a second power conveyor mounted in fixed position on the body structure to receive the material from the jib conveyor and to direct said material rearwardly of the body structure, and a discharge conveyor mounted on the body structure for lateral swinging movement relative thereto in position to receive the material from the fixed conveyor and to discharge said material from the machine, said discharge conveyor including a plurality of sections in series with one section mounted on the body structure for swinging movement about a substantially vertical axis and supporting the other sections of said discharge conveyor thereon for lateral swinging movement, a second section connected with the first-mentioned section and pivoted thereto for upward swinging movement, a discharge section supported by the second section, means connected with the second section for causing upward swinging movement thereof relative to the body structure, and means connected with another of said sections supported by said swinging section for holding said other section substantially in horizontal positions for the different positions of swinging movement of the first-mentioned section.

3. In a loading machine, the combination of a body structure, a jib section supported at the forward end of the body structure for lateral swinging movement relative thereto, a shoveling device supported on the jib section for shoveling material, a power conveyor supported on the jib section for receiving the material from the shoveling device and for conveying said material rearwardly therefrom, a second power conveyor mounted in fixed position on the body structure to receive the material from the jib conveyor and to direct said material rearwardly of the body structure, a discharge conveyor mounted on the body structure for lateral swinging movement relative thereto in position to receive the material from the fixed conveyor and to discharge said material from the machine, said discharge conveyor including a plurality of sections pivotally connected together in series with one section mounted on the body structure for swinging movement about a substantially vertical axis and movement supporting the other sections of said discharge conveyor thereon for lateral swinging movement, a second section connected with the first-mentioned section and pivoted thereto for upward swinging movement, power means connected with said second section for causing said upward swinging movement thereof, a discharge section supported by the second section, and means connected with the discharge section for maintaining said discharge section substantailly in horizontal positions for different vertically adjusted positions of the second section.

4. In a loading machine, the combination of a body structure, shoveling mechanism supported by the body structure, a power conveyor mounted on the body structure in fixed position relative thereto and adapted to receive material from the shoveling mechanism, and a power discharge conveyor in position to receive the material from the fixed conveyor and to discharge said material from the machine, said discharge conveyor including a plurality of sections pivotally connected together with one section mounted on the body structure for lateral swinging movement to opposite sides of the center thereof relative to said body structure and relative to the fixed conveyor, a second section supported by the first-mentioned section for upward swinging movement relative thereto, power means connected with the second section for causing said upward swinging movement, a third section supported by the second section for discharging the material, and means connected with said third section for maintaining said third section substantially in horizontal positions for different positions of vertical adjustment of the second section.

5. In a loading machine, the combination of a body structure, shoveling mechanism supported by the body structure, a power conveyor mounted on the body structure in fixed position relative thereto and adapted to receive material from the shoveling mechanism, and a power discharge conveyor in position to receive the material from the fixed conveyor and to discharge said material from the machine, said discharge conveyor including a plurality of sections pivotally connected together with one section mounted on the body structure for lateral swinging movement to opposite sides of the center thereof relative to said body structure and relative to the fixed conveyor, a second section supported by the first-mentioned section for upward swinging movement relative thereto, power means connected with the second section for causing said upward swinging movement, a third section supported by the second section for discharging the material, means connected with said third section for maintaining said third section substantially in horizontal positions for different positions of vertical adjustment of the second section, and power driving means for said discharge conveyor mounted in fixed relation to the first section thereof for lateral swinging movement therewith relative to the body structure.

6. In a loading machine, the combination of a body structure, a loading device mounted on the body structure for lateral swinging movement relative thereto, a power conveyor mounted on the body structure in position to receive the material from the loading device, a discharge conveyor mounted on the body structure for lateral swinging movement relative thereto in position to receive the material from the first-mentioned conveyor and to discharge said material from the machine, said discharge conveyor including a plurality of sections pivotally connected together in series with one section mounted on the body structure for swinging movement about a substantially vertical axis and supporting the other sections of said discharge conveyor thereon for lateral swinging movement and for vertical swinging movement relative to said first-mentioned section, a second section connected with the first-mentioned section and pivoted thereto for upward swinging movement, a discharge section supported by the second section, and means connected with the discharge section for maintaining said discharge section substantially in horizontal positions for different vertically adjusted positions of the second section.

7. In a loading machine, the combination of a body structure, a jib section supported at the forward end of the body section for lateral swinging movement relative thereto, a loading device supported on the jib section for loading material, a power conveyor supported on the jib section for receiving the material from the loading device and for conveying said material rearwardly therefrom, a second power conveyor mounted on the body structure to receive the material from the jib conveyor and to direct said material rearwardly of the body structure, a discharge conveyor mounted on the body structure for lateral swinging movement relative thereto in position to receive the material from the second conveyor and to discharge said material from the machine, said discharge conveyor including a plurality of sections pivotally connected together in series and with one section mounted on the body structure for lateral swinging movement relative thereto and supporting the other sections of said discharge conveyor for lateral swinging movement therewith and for vertical swinging movement relative to said first-mentioned section, a second section connected with the first-mentioned section and pivoted thereto for upward swinging movement, a discharge section supported by the second section, and means connected with the discharge section for maintaining said discharge section substantially in horizontal positions for all vertically adjusted positions of the second section.

8. In a loading machine, the combination of a body structure, a loading device mounted on the body structure for lateral swinging movement relative thereto, a power conveyor mounted on the body structure in position to receive the material from the loading device, a discharge conveyor mounted on the body structure for lateral swinging movement relative thereto in position to receive the material from the first-mentioned conveyor and to discharge said material from the machine, said discharge conveyor including a plurality of sections pivotally connected together in series with one section mounted on the body structure for swinging movement about a substantially vertical axis and supporting the other sections of said discharge conveyor thereon for lateral swinging movement and for vertical swinging movement relative to said first-mentioned section, a second section connected with the first-mentioned section and pivoted thereto for upward swinging movement, a discharge section supported by the second section, means connected with the discharge section for maintaining said discharge section substantially in horizontal positions for different vertically adjusted positions of the second section, and a hydraulic power device connected with the second section at each opposite side of said discharge conveyor for causing said upward swinging movement thereof.

9. In a loading machine, the combination of a body structure, a loading device mounted on the body structure for lateral swinging movement relative thereto, a power conveyor mounted on the body structure in position to receive the material from the loading device, a discharge conveyor mounted on the body structure for lateral swinging movement relative thereto in position to receive the material from the first-mentioned conveyor and to discharge said material from the machine, said discharge conveyor including a plurality of sections pivotally connected together in series with one section mounted on the body structure for swinging movement about a substantially vertical axis and supporting the other sections of said discharge conveyor thereon for lateral swinging movement and for vertical swinging movement relative to said first-mentioned section, a second section connected with the first-mentioned section and pivoted thereto for upward swinging movement, a discharge section supported by the second section, means connected with the discharge section for maintaining said discharge section substantially in horizontal positions for different vertically adjusted positions of the second section, said second section having a bracket secured thereto at each opposite side thereof and extending rearwardly therefrom, and a hydraulic power device connected with each bracket and with the body structure for causing said upward swinging movement of the second section.

10. In a loading machine, the combination of a body structure, a loading device mounted on the body structure for lateral swinging movement relative thereto, a power conveyor mounted on the body structure in position to receive the material from the loading device, a discharge conveyor mounted on the body structure for lateral swinging movement relative thereto in position to receive the material from the first-mentioned conveyor and to discharge said material from the machine, said discharge conveyor including a plurality of sections pivotally connected together in series with one section mounted on the body structure for swinging movement about a substantially vertical axis and supporting the other sections of said discharge conveyor thereon for lateral swinging movement and for vertical swinging movement relative to said first-mentioned section, a second section connected with the first-mentioned section and pivoted thereto for upward swinging movement, and a discharge section supported by the second section.

11. In a loading machine, the combination of a body structure, a loading device mounted on the body structure for lateral swinging movement relative thereto, a power conveyor mounted on the body structure in position to receive the material from the loading device, a discharge conveyor mounted on the body structure for lateral swinging movement relative thereto in position to receive the material from the first-mentioned conveyor and to discharge said material from the machine, said discharge conveyor including a plurality of sections pivotally connected together in series with one section mounted on the body structure for swinging movement about a substantially vertical axis and supporting the other sections of said discharge conveyor thereon for lateral swinging movement and for vertical swinging movement relative to said first-mentioned section, a second section connected with the first-mentioned section and pivoted thereto for upward swinging movement, a discharge section supported by the second section, and hydraulic power devices connected with the second section of the discharge conveyor for causing upward swinging movement thereof.

12. In a loading machine, the combination of a body structure, a loading device mounted on the body structure for lateral swinging movement relative thereto, a power conveyor mounted on the body structure in position to receive the material from the loading device, a discharge conveyor mounted on the body structure for lateral swinging movement relative thereto in position to receive the material from the first-mentioned conveyor and to discharge said material from the machine, said discharge conveyor including a plurality of sections pivotally connected together in series with one section mounted on the body structure for swinging movement about a substantially vertical axis and supporting the other sections of said discharge conveyor thereon for lateral swinging movement and for vertical swinging movement relative to said first-mentioned section, a second section connected with the first-mentioned section and pivoted thereto for upward swinging movement, a discharge section supported by the second section, brackets attached to the second section of the discharge conveyor, and hydraulic power devices connected with the brackets for causing upward swinging movement of said section.

13. In a loading machine, the combination of a body structure, a loading device mounted on the body structure for lateral swinging movement relative thereto, a power conveyor mounted on the body structure in position to receive the material from the loading device, a discharge conveyor mounted on the body structure for lateral swinging movement relative thereto in position to receive the material from the first-mentioned conveyor and to discharge said material from the machine, said discharge conveyor including a plurality of sections pivotally connected together in series with one section mounted on the body structure for swinging movement about a substantially vertical axis and supporting the other sections of said discharge conveyor thereon for lateral swinging movement and for vertical swinging movement relative to said first-mentioned section, a second section connected with the first-mentioned section and pivoted thereto for upward swinging movement, a discharge section supported by the second section, hopper plates pivotally mounted on the body structure at opposite sides of the power conveyor and extending in overlapping relation with the first-mentioned section of the discharge conveyor, and hydraulic power devices connected with said first-mentioned section and with the hopper plates for causing said swinging movement of the discharge conveyor relative thereto.

WILLIAM WHALEY.

REFERENCES CITED

The following references are of record in the file of this patent:

UNITED STATES PATENTS

| Number | Name | Date |
|---|---|---|
| 1,814,067 | Whaley | July 14, 1931 |
| 1,839,625 | Whaley | Jan. 5, 1932 |
| 1,908,434 | Madeira | May 9, 1933 |
| 2,024,458 | Kraft | Dec. 17, 1935 |
| 2,030,063 | Halleck | Feb. 11, 1936 |
| 2,189,869 | Sloane | Feb. 13, 1940 |
| 2,258,965 | Baechli | Oct. 14, 1938 |
| 2,338,704 | Clarkson et al. | Jan. 11, 1944 |
| 2,358,849 | Cartlidge | Sept. 26, 1944 |
| 2,370,147 | Clarkson | Feb. 27, 1945 |

FOREIGN PATENTS

| Number | Country | Date |
|---|---|---|
| 490,066 | Great Britain | Aug. 9, 1938 |